Oct. 25, 1960    E. J. HERBENAR    2,957,705
LEVELING VALVE SYSTEM FOR FLUID PRESSURE SUSPENSION
Filed Oct. 2, 1956
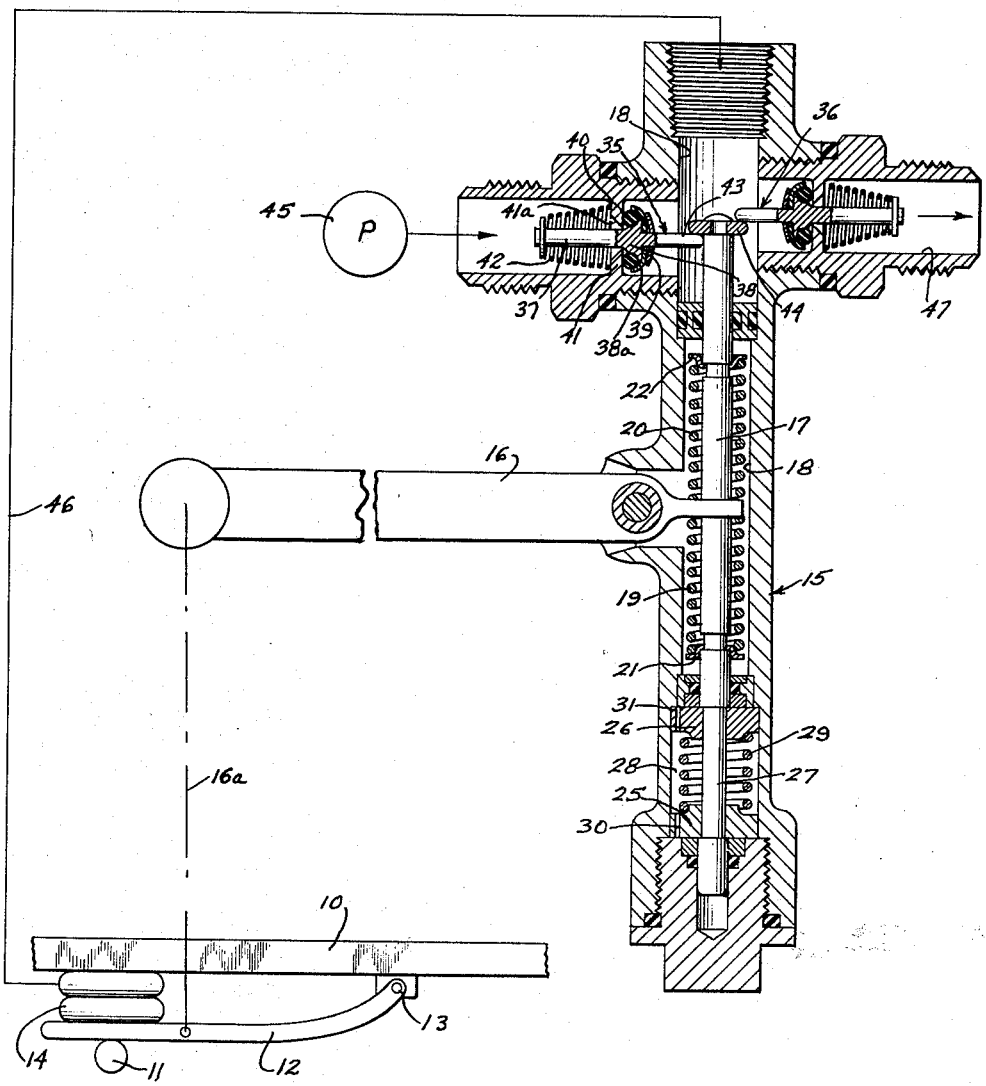
Inventor
Edward J. Herbenar

United States Patent Office 2,957,705
Patented Oct. 25, 1960

1

2,957,705

LEVELING VALVE SYSTEM FOR FLUID PRESSURE SUSPENSION

Edward J. Herbenar, Detroit, Mich., assignor to Thompson Ramo Wooldridge Inc., a corporation of Ohio Filed Oct. 2, 1956, Ser. No. 613,570

6 Claims. (Cl. 280—124)

The present invention relates to systems for automotive vehicles wherein a body suspension leveling means is provided for maintaining the vehicle body at a predetermined height independently of variations in vehicle load. Particularly, the present invention is concerned with the provision of a novel and substantially improved leveling control valve.

As those skilled in the art of vehicle leveling systems are aware, much effort has been expended in the automotive industry in an attempt to obtain a simple leveling valve capable of satisfactorily handling pressure media without leakage and without complicated seals or other valve parts. As a result of such efforts, many valve constructions have been provided in vehicle body leveling systems. However, to my knowledge, none of them have proven completely satisfactory. It has been found that valves employing ball check valves, as well as those employing sliding or reciprocating spool valves, leak a small amount. While such leakage is, of course, of little or no significance during operation of the vehicle, any leak whatever in the system during that period in which the vehicle is standing idle, will permit the vehicle suspension to collapse, providing a condition in which the vehicle body is down on the axles of the vehicle suspension. Collapse of the suspension in the standing position of the vehicle is unsightly and is considered extremely undesirable in any commercially acceptable vehicle leveling system.

The present invention is concerned with the provision of a completely successful valve for use in vehicle leveling system. In accordance with the principles of the present invention a simple valve element is provided which is absolutely completely sealed in its normal position, even where the leveling valve is used with a pneumatic system employing air or other gas under pressure for leveling purposes.

The leveling valve provided in accordance with the principles of the present invention comprises at least one and preferably a plurality of tilt valves loosely centered in respective control passages and spring biased into the valve-closed condition. Each of the tilt valves preferably comprises a valve rod extending generally longitudinally of the valve passageway and having an enlarged head portion thereon for supporting an annular O-ring seal element. A spring biasing force is applied to the valve rod urging the enlarged head portion thereof, and the seal carried therewith, against an apertured partition extending across the valve passageway. The valve rod is loosely mounted within the passageway except for the spring biasing means above mentioned and may be unseated by deflecting the valve rod transversely of its longitudinal dimension. This movement tends to rock the valve about one edge of the O-ring seal and release of the valve rod permits the O-ring to reseat, completely sealing off the valve passageway.

It has been found through test procedures that the tilt valves above described, utilized in combination with an actuating rod moving the transversely to the longitudinal axis of the various leveling valve rods provides a practical, non-leak leveling valve of minimum expense and with no intricately machined valve surfaces. Further, in accordance with the principles of the present invention, the valves are constructed to provide a substantially greater sealing force than the force tending to cause valve leakage, thereby assuring a complete valve seal at all times in the leveling system.

Another feature of the leveling valve of the present invention is the provision of a time delay means preventing actuation of the leveling valves except upon a maintained change in vehicle load. Instantaneous vibrations in the vehicle are not permitted to cause actuation of the individual tilt valve. However, the tilt valves of the present invention are extremely rapidly acting and permit the passage of leveling fluid at a high rate of speed. These advantages of the specific valve structure herein employed are satisfactorily retained through the provision of a lost motion connection in the time delay means which permits a time delay in the opening of any individual leveling tilt valve but substantially eliminates delay in closing the valve upon attainment of a predetermined vehicle level as a result of a leveling action. The result of this construction is a complete control of fluid flow at all times by apparatus which has been found to eliminate problems of leakage and vehicle body settling, at materially reduced cost.

It is, accordingly, an object of the present invention to provide a vehicle leveling system employing a rapid acting leveling valve arranged to preclude valve leakage.

Another object of the present invention is to provide a substantially simplified and hence less expensive control valve for use in vehicle leveling systems or the like.

Yet another object of the present invention is to provide a simplified leveling valve arrangement utilizing transversely actuated, positively sealing, valves, requiring a minimum net actuating, or control force.

Still a further object of the present invention is to provide a leveling valve of a fast acting type permitting the rapid transmission of leveling fluid under pressure upon a maintained change in vehicle load while at the same time permitting substantially instantaneous closing of the vehicle leveling valve upon attainment of a predetermined desired vehicle body level.

A feature of the present invention is the provision of a reciprocal valve actuating member positioned between a pair of transversely mounted tilt valves for the actuation thereof upon reciprocation of the valve actuating rod in either direction.

Still a further feature of the invention is the provision of a pair of selectively actuated tilt valves actuated by means of a reciprocating valve actuating rod under the control of a one-way dash pot permitting only slow opening of an individual tilt valve but permitting rapid closure thereof upon return of the valve actuating rod to its central, or inactive position.

Still other and further objects and features of the present invention will at once become apparent to those skilled in the art from a consideration of the attached drawings in which the figure illustrates, somewhat diagrammatically, a leveling valve constructed in accordance with the principles of the present invention in side elevation and in cross-section.

As shown on the drawings:

As may be seen in the figure, a vehicle frame is diagrammatically illustrated at 10. In this diagrammatic illustration, the axle of a vehicle wheel, here shown as a rear axle, is illustrated at 11 and is carried by a trailing link 12 pivotally secured at 13 to the frame 10. Movement of the axle 11 relative to the frame 10 is controlled by a hydraulic spring 14 which may be a liquid or a pneumatic element. An increase in the pressure of the hydraulic fluid in the spring 14 will cause the frame 10 to be lifted upwardly relative to the axle 11 and, alternatively, a decrease in pressure in the spring element 14 will permit the frame 10 to drop relative to the axle 11. The hydraulic fluid utilized in the spring 14 is of sufficient resiliency to permit oscillation of the system under vibratory conditions and, accordingly, to is intended that the spring element 14 comprise the main suspension spring for each of the vehicle wheels.

In the system herein contemplated, it is desired that the frame 10 be maintained at a substantially constant position relative to the frame 11 independently of the load applied to the frame 10. This may be accomplished by the control of the hydraulic pressure in the spring 14 in response to relative movement between the frame 10 and the axle 11. Such a control is provided in the present system through a leveling valve generally indicated at 15. The valve 15 is operated by a pivoted lever 16 which is linked by means of a rigid, though preferably adjustable, link 16a, to the trailing link arm 12. The link 16a is not illustrated in structural form since it will be apparent that any rigid link construction may satisfactorily be employed. Such rigid links, with a longitudinal adjustment, are prior art and per se form no part of the present invention. With the arrangement, as thus shown, relative movement between the frame 10 and the axle 11 is reflected by oscillation of the lever 16 which in turn controls a leveling valve influencing the pressure in spring 14.

Details of a preferred form of the leveling valve may be seen in the figure wherein an actuating rod 17 is reciprocably mounted in a longitudinal bore 18 in the valve housing 15. The actuating rod 17 is reciprocated by oscillation of the lever 16 through opposed centering springs 19 and 20 acting through abutment stops 21 and 22 respectively. The stops 21 and 22 may comprise C-shaped seats of the type ordinarily used with poppet valve springs, as shown, and accordingly, a simple resilient connection is provided between the rod 17 and the lever 16.

The actuating rod 17 is controlled in its reciprocal movement by a time delay dash pot structure. This structure comprises a pair of dash pot piston members 25 and 26 slidably mounted on a reduced diameter portion 27 on the shaft 17. Hydraulic fluid is provided in the chamber 28 and the pistons 25 and 26 are permitted to move in the fluid in the chamber 28 by means of the restricted ports 30 and 31. As a result, movement of the actuating rod 17 away from the neutral position shown will move one or the other of the pistons 25 and 26. For example, if the actuating rod moves downwardly as viewed in the drawings, it will carry with it the piston 26 but will slide through the piston 25. A restriction of the flow of fluid through the orifice 31 will cause a retarding action on the movement of the actuating rod 17 as it moves away from its neutral position. Upon a return movement of the actuating rod 17 toward its neutral position, however, the retarding of the motion of the piston 26 has no effect since the actuating rod is slidable therein when moving in a direction tending to return the shaft or rod 17 to neutral. As a result of this arrangement, a quick recovery of the valve actuating rod 17 is accomplished, while at the same time any forces tending to actuate the rod 17 away from its neutral position and into a position energizing the valve elements, described below, is delayed by the action of the dash pot.

Control of the hydraulic fluid of the spring element 14 is accomplished by means of a pair of transversely actuated tilt valves 35 and 36. As may be seen, each of the valves 35 and 36 comprises a longitudinal valve rod 37 having a head portion 38 including a sheet metal cover 38a retained against the main body of the head 38 by means of a spring clip 39. An annular O-ring 40 is positioned between the head 38, 38a and the valve orifice-defining wall 41 through which the rod 37 projects. A spring 42 urges the rod 37 through the orifice 41a, thereby urging the O-ring into tight sealing engagement with the wall 41. Each of the valves 35 and 36 is provided with a rod extension 43 which extends into the longitudinal bore 18 for contact with a head portion 44 on the actuating rod 17. It will be seen that movement of the actuating rod upwardly as viewed in the drawing will tilt valve 36 while movement of the rod 17 downwardly will tilt valve 35.

As a result of the arrangement shown, movement of the axle 11 upwardly relative to the frame 10, will, if such movement tends to persist for a period of time, cause shaft 17 to move downwardly, actuating tilt valve 35 into a position in which the O-ring is canted on its seat and hydraulic fluid under pressure is directed from the pump 45 into the longitudinal bore 18 and from thence to the spring element 14 via conduit 46 diagrammatically shown. Conversely, if a load is removed from the frame 10 causing the movement of the frame 10 upwardly away from the axle 11, and such load is removed for a substantial period of time, the actuating rod 17 will move upwardly under the influence of the spring 20 thereby tilting valve 36 and permitting passage of fluid under pressure from the spring element 14 through the conduit 46 and out through conduit 47 to atmosphere or a low pressure sump. In practice, it has been found particularly desirable in pneumatic installations wherein gas flow is controlled by the present valve to utilize a pump pressure approximately 90 lbs. in value with a pneumatic spring pressure of approximately 40 to 50 lbs. per square inch. With such a pressure differential between the pump 45 and the longitudinal bore 18, the spring 42 should be sufficiently strong to prevent unseating of the valve 35. This may, of course, be readily accomplished through the utilization of a relatively stiff spring. However, it is noted that the present design is essentially fail-safe since even if the valve 35 were to be slightly opened upon an excess pressure in the pump 45, such pressure would merely act to raise the frame 10 relative to the axle 11, which action would immediately be compensated for by a relief in the air pressure by opening the valve 36. As a result, even if the valve 35 should inadvertently open as a result of an excess pressure differential, this opening would not result in a modification of the level condition of the vehicle. Further, upon stopping of the vehicle for parking purposes, the pressure differential would reverse, in the absence of a pump outlet pressure and, accordingly, the pneumatic fluid would be trapped in the spring 14 and the vehicle body could not drop relative to the axle. For purposes of extreme efficiency, however, it is noted that the valve 35 may be reversed to apply the fluid pressure closing force in the opposite direction where it is intended that extremely high pump pressures be employed. Under such an arrangement, the valve rod 37 would contact the actuating rod head 44 rather than the extension 43.

In constructing the orifices 41a, a beveled surface is provided to permit tilting of the valve rod 37 relative thereto. Further, the inside diameter of the aperture is preferably substantially larger than the external diameter of the valve rod 37 whereby permitting a rapid flow of air or liquid through the orifice during valve actuation. By providing rapid fluid flow during valve actuation, the present system provides an extremely rapidly acting leveling action which, in combination with the one-way dash pot action of the pistons 25, 26, permits the vehicle to be changed in level with a change in load in a very rapid manner.

It has been found that the provision of transversely actuated tilt valves 35 and 36 has provided an extremely simple and yet highly effective valve arrangement. The O-ring valve seats herein utilized provide absolutely positive sealing even where high pressure pneumatic fluid is employed. Further, no valve seat honing or other costly finishing operations are required and, accordingly, the expense of the valve is maintained at an absolute minimum. Further still, the tilt valves here utilized permit a very small net actuating force on the rod 17 to effect a full opening of the tilt valves. The force necessary to provide valve opening may be still further reduced, if considered desirable, by lengthening the extension 43 and moving the orifice 41a away from the bore 18.

It will thus be seen that a substantially improved and an extremely inexpensive leveling system is provided for vehicles through the present invention. It will be, further, obvious to those skilled in the art that variations and modifications may be made in accordance with the principles of the present invention without departing from the scope of the novel concepts thereof. Accordingly, it is my intention that the scope of the present invention be limited solely by that of the hereinafter appended claims.

I claim as my invention:

1. A leveling valve for control of a pneumatic spring under a positive pneumatic pressure comprising, a housing having a longitudinally extending bore, a valve actuating rod reciprocably mounted in said bore, means providing a fluid connection between said bore and said spring, a transverse bore, means supplying fluid under pressure to said transverse bore, an orifice in said transverse bore, a valve in said transverse bore for controlling fluid flow through said orifice, said valve comprising a valve rod extending through said orifice and having an enlarged head, a deformable annular ring positioned between said head and said orifice, means biasing said head towards said orifice to seal said orifice, said valve rod having a longitudinal extension thereon projecting into said longitudinal bore for cooperation with and lateral tilting by said actuating rod, means normally resiliently maintaining said actuating rod in a centered condition closely adjacent to said extension but inoperative to tilt said extension when in said centered condition, and means for moving said actuating rod to tilt said extension and valve to control the pressure in said spring.

2. A leveling valve comprising a housing, a longitudinal bore in said housing having a positive fluctuating pressure therein, a transverse bore in said housing having the pressure therein greater than the average pressure in said longitudinal bore, said transverse bore opening into said longitudinal bore, a rod reciprocably mounted in said longitudinal bore, means for reciprocating said rod, and a tilt valve in said transverse bore normally sealing the end of said transverse bore from said longitudinal bore, said tilt valve having a head thereon in said transverse bore and seating over the end of said transverse bore and having an actuating member extending into said longitudinal bore, means biasing said tilt valve against said transverse bore end, and means on said rod for tilting said actuating member upon reciprocation of said rod in one direction away from a desired neutral control position in said longitudinal bore to thereby unseat said tilt valve and apply pressure from said transverse bore to said longitudinal bore.

3. In combination in a leveling valve system for a pneumatic spring, a source of gas under pressure, a leveling valve for controlling said pneumatic spring, and means for actuating said leveling valve said leveling valve comprising an actuating member mounted in a chamber at the pressure of said spring and normally centered between but movable to tilt a pair of valve rods, said valve rods being tiltable transversely of their longitudinal axes and about a peripheral surface thereof to open a respective normally closed valve controlled by said respective valve rods whereby a small force on said actuating member causes a rapid opening of the respective tilt valve to selectively connect said chamber to said source or to atmosphere.

4. In combination in a leveling valve system for a pneumatic spring, a source of gas under high pressure for inflating said spring, a leveling valve for controlling the flow of gas to and from said spring, and means for actuating said leveling valve said leveling valve comprising an actuating member mounted in a chamber at the pressure of said spring and normally centered between but movable to tilt a pair of valve rods extending generally transversely to the path of movement of the actuating member actuating them, said valve rods each having a valve head member associated therewith and biased into normally sealing cooperation with a valve orifice and arranged so that tilting movement of said respective valve rod will pivot said valve rod about one edge of its respective head to open its respective valve opening whereby a small movement of said actuating member against a respective valve rod causes a tilting movement of said valve rod with a corresponding rapid opening of the control valve to selectively connect said chamber to said source or to atmosphere.

5. In combination in a leveling valve system for a pneumatic spring, a source of gas under high pressure for inflating said spring, a leveling valve for controlling the flow of gas to and from said spring, and means for actuating said leveling valve said leveling valve comprising an actuating member mounted in a chamber at the pressure of said spring and normally centered between but movable to tilt a pair of valve rods extending generally transversely to the path of movement of the actuating member actuating them, said valve rods each having a valve head member associated therewith and biased into normally sealing cooperation with a valve orifice and arranged so that tilting movement of said respective valve rod will pivot said valve rod about one edge of its respective head to open its respective valve opening whereby a small movement of said actuating member against a respective valve rod causes a tilting movement of said valve rod with a corresponding rapid opening of the control valve to selectively connect said chamber to said source or to atmosphere, said actuating member comprising a reciprocating rod having means thereon retarding movement thereof away from a predetermined desired central position but not retarding movement thereof back towards said central position.

6. In combination in a leveling valve system for a pneumatic spring, a source of gas under high pressure for inflating said spring, a leveling valve for controlling the flow of gas to and from said spring, and means for actuating said leveling valve said leveling valve comprising an actuating member mounted in a chamber at the pressure of said spring and normally centered between but movable to tilt a pair of valve rods extending generally transversely to the path of movement of the actuating member actuating them, said valve rods each having a valve head member associated therewith and biased into normally sealing cooperation with a valve orifice and arranged so that tilting movement of said respective valve rod will pivot said valve rod about one edge of its respective head to open its respective valve opening whereby a small movement of said actuating member against a respective valve rod causes a tilting movement of said valve rod with a corresponding rapid opening of the control valve to selectively connect said chamber to said source or to atmosphere, each of said heads of said valve rods having an annular resilient sealing member positioned between the head thereof and the edge of the valve opening associated therewith whereby a tight seal is effective between the head and the valve opening except when said head is tilted about one edge thereof by said actuating member.

References Cited in the file of this patent

UNITED STATES PATENTS

| | | |
|---|---|---|
| 258,432 | Keith | May 23, 1882 |
| 1,105,805 | Liebowitz | Aug. 4, 1914 |
| 1,664,510 | Hughes | Apr. 3, 1928 |
| 2,670,201 | Rossman | Feb. 23, 1954 |
| 2,683,352 | Price | July 13, 1954 |